United States Patent [19]

Louderback

[11] Patent Number: 5,089,348
[45] Date of Patent: Feb. 18, 1992

[54] PRECURED LAMINATE OVERLAY

[76] Inventor: Lauren G. Louderback, 9431 N.E. Eric, P.O. Box 10398, Bainbridge Island, Wash. 98110

[21] Appl. No.: 375,392

[22] Filed: Jul. 3, 1989

[51] Int. Cl.$^5$ .................. B32B 15/10; B32B 27/10; B32B 31/00
[52] U.S. Cl. .................. 428/464; 428/481; 428/529; 428/531; 428/535; 156/323; 156/182; 156/247
[58] Field of Search .......... 428/526, 528, 464, 481, 428/529, 531, 535

[56] References Cited

U.S. PATENT DOCUMENTS

| | | | |
|---|---|---|---|
| 2,405,235 | 8/1946 | Randall | 154/45.9 |
| 3,929,545 | 12/1975 | Van Dyck et al. | 156/220 |
| 3,981,762 | 9/1976 | Davis et al. | 156/322 |
| 4,084,996 | 4/1978 | Wheeler | 156/257 |
| 4,210,692 | 7/1980 | Bohme et al. | 428/106 |
| 4,258,103 | 3/1981 | Hosmer et al. | 428/342 |
| 4,552,792 | 11/1985 | Julian et al. | 428/40 |
| 4,898,788 | 2/1990 | Minami et al. | 428/481 |

FOREIGN PATENT DOCUMENTS 437656 10/1946 Canada.

Primary Examiner—P. C. Sluby
Attorney, Agent, or Firm—Christensen, O'Connor, Johnson & Kindness

[57] ABSTRACT

An improved method for providing a smooth, abrasion resistant surface substantially free of surface irregularities on a solid substrate possessing surface irregularities, the method comprising the steps of: (a) forming an uncured and unbonded laminate overlay of at least two sheets of cellulose impregnated with a thermosettable resin; (b) substantially curing the thermosettable resin to form a laminate overlay that is both precured and bonded; and (c) adhering the precured bonded laminate overlay to a solid substrate possessing surface irregularities so as to substantially bridge the irregularities. The method has particular application to the manufacture of concrete forms.

19 Claims, 1 Drawing Sheet

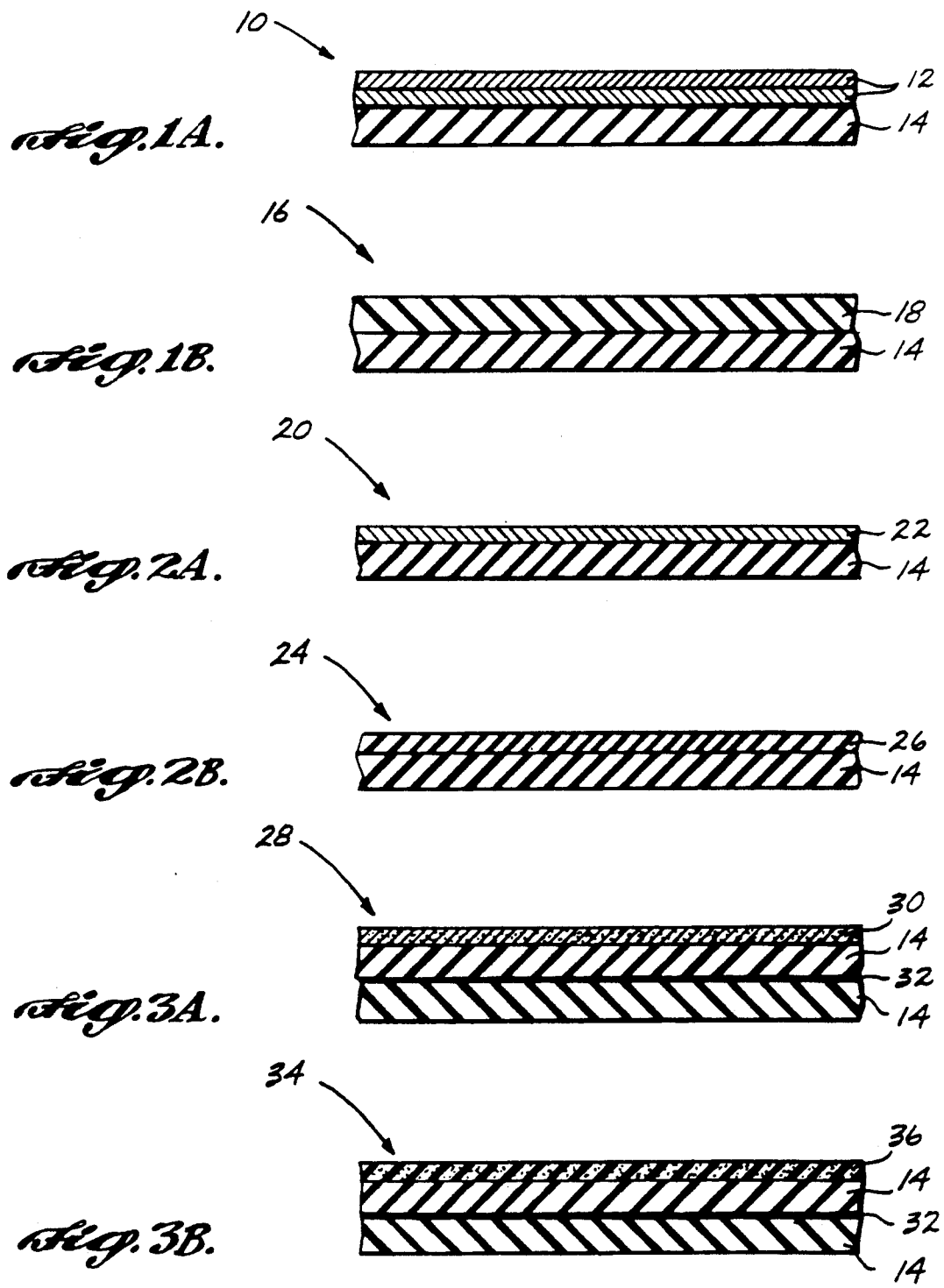

PRECURED LAMINATE OVERLAY

TECHNICAL FIELD

This invention relates to overlays and, more particularly, to laminate overlays for solid substrates such as plywood and the like.

BACKGROUND OF THE INVENTION

Wood is an extremely desirable construction material because it is inexpensive, durable, lightweight, relatively weather resistant, and easily fashioned into useful end products. However, certain of the natural characteristics of wood must be overcome for man to make use of many potential wood products. For instance, wood has knots, splits, and pitch pockets that mar its surface. Wood has high and low density growth rings that are difficult to hide. Wood swells and shrinks dramatically with moisture variation. Wood also has soluble extracts that may leave the surface of the wood and participate in undesired chemical reactions with substances at the wood surface.

Consequentially, a number of methods have been used to take advantage of wood's desirable characteristics while overcoming the undesirable characteristics. In the specific case of plywood, the methods include: selecting higher quality veneers for exposed panel surfaces; removing and repairing knots and pitch pockets; repairing splits; sanding the veneers to impart a smoother surface; and applying overlays.

Overlays for plywood, and similar substrates, have proven relatively effective in hiding veneer repairs, helping provide a smoother surface, reducing shrink and swell, and providing a surface seal that prevents water from entering and wood extracts from exiting through the surface. However, in recent years the quality of available logs and, correspondingly, veneer quality have dramatically dropped. Among the factors promoting this drop in quality are the following: (1) virtually all of the fine grain, slow growing, and relatively defect-free old growth timber has been harvested, being replaced by fast growing and knotty second growth timber, due to the fact that timber harvest rates have exceeded sustained yield rates and due to the dramatic increase in log export volume to the Orient; (2) the desire to retain for posterity the small amount of old growth timber left; and (3) the discovery that some species (e.g., the spotted owl) can exist only in old growth forests. As a result of the drop in wood quality, the situation has gone from one where overlays were readily and easily used to upgrade high quality veneers to one where even maximum overlay efforts via conventional methods may lead to undesired surface characteristics due to the lower quality of the underlying veneer.

In an effort to circumvent this problem, a defect-free substitute for outside plywood veneers was developed. As discussed in U.S. Pat. No. 4,210,692 issued to Bohme et al. in 1980, sawdust, pulp, and 0.2 to 4.0% resin are formed into a sheet of essentially homogeneous material, known as Lebonite, which is then subjected to a hot press. The result is a veneer of excellent surface smoothness that may be employed as the surface ply in plywood. While not an overlay per se, its purpose is identical. However, a chief disadvantage of a Lebonite veneer is that it possesses virtually no water resistance. Consequently, its use has been restricted to interior applications.

A chief area of application for plywood overlays is with concrete forms. This application requires that the surface of the form possess a very smooth finish so as to impart a similar finish to the surface of the concrete. Additionally, it is imperative that the overlay surface possess abrasion resistance and, more importantly, water resistance. Clearly, Lebonite could not be used in the concrete forms application due to its poor water resistance. While the desired surface properties are possible with Formica overlays and the like, they have proven too expensive for concrete form application. Instead, sheets of paper impregnated with resin material, usually phenolic resin, have been used to create the desired overlay.

For years, most concrete forms were overlaid with a single cured cellulose sheet impregnated with medium density phenolic resin (hereinafter MDO, which stands for medium density overlay). The same is true today. However, this overlay possesses only moderate abrasion resistance and water resistance. Accordingly, concrete forms bearing this overlay are capable of only approximately 20 reuses before an intolerable level of degradation of the form occurs.

In an effort to increase the number of reuses possible with concrete forms, an overlay was developed that consisted of two uncured cellulose sheets impregnated with high density phenolic resin (hereinafter HDO, which stands for high density overlay). When used on the higher quality veneers abundantly available in the past, this overlay resulted in a concrete form capable of as many as 100 reuses before intolerable degradation occurs. The increase in reuses was directly attributable to the much improved abrasion resistance and water resistance of this overlay.

HDO and MDO are defined under U.S. Products Standards (PS1-83), which state that cellulosic overlay sheets having 22 to 45% phenolic resin are MDO, whereas those having greater than 45% phenolic resin are HDO. Since phenolic resin is a thermosettable material, it has a fixed final structure after curing has taken place. MDO sheets are traditionally completely cured during fabrication. Thus, their resin component will not remelt and flow when subsequently heated during adherence to the plywood substrate. Additionally, an adhesive must be employed to provide adherence. In contrast, HDO sheets are not cured during fabrication, so their resin component will remelt and flow during subsequent heating. It is this characteristic that makes HDO sheets self-binding, thus eliminating the need for an adhesive.

As the quality of veneer has decreased, the ability of the double HDO sheet overlay to adequately cover veneer defects has also decreased. The result has been a drop in surface smoothness, abrasion resistance, water resistance, and number of reuses previously possible with the double HDO sheet overlay.

In an attempt to retain the increased level of reuses and surface quality, an overlay consisting of two HDO sheets over a single MDO sheet has developed in the last three or four years. This laminate overlay is known in the plywood industry as a Hi-Med overlay. While the Hi-Med overlay is roughly twice as costly as a single MDO sheet or a double HDO sheet overlay, it has produced concrete forms of moderate smoothness capable of approximately 50 reuses on the typically available lower grade veneers of today.

A single sheet of HDO having a very high resin content (nearly 70%) over a single sheet of MDO was attempted as a concrete form overlay. This attempt was unsuccessful because the extremely high resin content led to extensive overlay shrinkage. The shrink factor simply could not be overcome, and this approach was quickly abandoned in favor of the Hi-Med overlay.

When concrete forms bearing a Hi-Med overlay are produced, the overlay and the underlying plywood substrate of the concrete form are usually formed together in a one-step manufacturing process. In this one-step process, the two HDO sheets over a single MDO sheet that make up the Hi-Med overlay are positioned upon a caul, which is a thin sheet of polished aluminum. The HDO sheet distant from the MDO sheet is in contact with the caul. If an overlaid plywood panel measuring four feet by eight feet is the desired product, the caul measures roughly 52 inches by 101 inches, and has a thickness of 0.04 inches. The purpose of the caul is to help provide as smooth an outer surface to the overlay as is possible. To keep the overlay from sticking to the surface of the caul, the caul is treated with a release agent. Often, a solution of approximately 10% stearic acid in isopropyl alcohol is used.

Using 5-plywood as an example, after the two HDO and one MDO sheets are laid down on the treated caul, the following items are chronologically stacked over the sheets: a layer of low water content adhesive, a face ply, a layer of glue (production grade), a core ply, a layer of glue, a center ply, a layer of glue, another core ply, a layer of glue, a back ply, a single HDO sheet as a backer sheet used to control warp, and a second treated caul. The backer sheet helps control warp by counteracting the warp caused by the overlay at the opposite surface of the solid substrate. Since an HDO sheet is self-binding, no lower water content adhesive would be required. If an overlay surface is desired on both sides, the backer sheet is replaced by a layer of low water content adhesive and the two HDO and one MDO sheets making up the second overlay. As is obvious, it is standard practice for the highest quality veneers to be used as the outermost layers of the plywood substrate over which is laid an overlay.

Normally, the low water content adhesive is prefabricated onto one side of the MDO sheet used in the overlay, thereby eliminating the need for the application of the adhesive layer. A low water content adhesive is required to adhere the overlay because the water present turns to steam as heat is applied, causing blisters to form under the overlay, thereby adversely affecting overlay surface characteristics. Conversely, the water in the production grade glue between wooden plys (veneers) is more readily absorbed by the wood and, therefore, not a problem. In a large-scale, commercial production setting, the entire above-described composite housed between the cauls is then inserted as a unit into a conventional plywood hot press. The plywood hot press usually consists of a bank of polished steel platens having some 12 to 50 openings, each opening designed to accommodate the aforementioned composite surrounded by cauls. Each platen has steam distributed internally in order to expose the composite to a temperature of approximately 300° F. The platens are connected via a hydraulic ram system so as to impart pressures of roughly 200 psi gauge to the composite. At pressures much above 200 psi gauge, wood of the type commonly used in plywood (fir, etc.) begins to compress. At pressures significantly less, proper bonding will not occur. In the case of automatically operated plywood hot presses, the cauls often interfere with the automated machinery. As a result, such production facilities normally have one or more separate overlay hot presses devoted to plywood that is to be overlaid. These overlay hot presses tend to be of lower production capacity and tend to require a moderate amount of manual operation.

If plywood alone is manufactured, the residence time within the hot press is roughly 4 to 6 minutes, which corresponds to the time required to adequately cure the production grade glue between veneers. Six minutes is normally required for ⅝ inch plywood, which is the most common thickness used for concrete forms. However, when a Hi-Med overlay is used, the residence time must be increased to approximately 9 minutes in order that the uncured resin present in the two HDO sheets may be cured.

Overlay shrinkage that occurs during curing is a major concern. Severe levels of shrinkage can cause face checks in the concrete forms. Face checks are splits in the overlay, and sometimes the underlying plywood, that may occur during fabrication or during later field use. Overlay shrinkage can also cause warping of the underlying plywood. To help combat shrinkage, the finished concrete forms are immediately exposed to a flow of air, often through the use of high speed fans, in order to quickly cool the overlays. Despite such efforts, shrinkage remains a serious problem.

A primary disadvantage of using the one-step manufacturing process with Hi-Med overlay and lower quality veneer is the corresponding lower quality characteristics obtained at the overlay surface. This occurs because the uncured resin in the HDO sheets begins to melt and freely flow over the surface of the underlying MDO sheet when first exposed to the hot press. The uncured resin remains in this semi-liquid state until sufficient time has passed for the curing process to begin. It is not until this point that the uncured resin becomes cross-linked, thereby establishing the final structure that the outermost layer of the overlay will take. As a result of this free-flowing aspect of the uncured resin, the outermost layer of the overlay (formed by the two HDO sheets) tends to mirror the surface of the underlying MDO sheet. While the MDO sheet contains cured resin, and thereby principally maintains its structural identity to form a bridge between the underlying veneer of the plywood substrate and the outermost layer of the overlay, it does not act as a complete bridge. Because high amounts of heat and pressure are exerted on the MDO sheet in the hot press, the MDO sheet does tend to pick up some of the surface irregularities of the underlying veneer of the plywood substrate. When the uncured resin in the outermost layer of the overlay is cured, thereby becoming thermoset, this outermost layer also tends to mirror the surface irregularities of the veneer, albeit to a somewhat lesser degree.

A two-step manufacturing process has developed that provides an overlaid concrete form with surface quality superior to that obtained under the one-step manufacturing process. The two-step process consists of the manufacture of plywood alone in a manner virtually identical to that described above. Because lower quality veneer is the source of the problem, the outermost veneer surface is repaired after the plywood substrate, or panel, has been separately manufactured. Repair generally consists of removal of knots and pitch pockets and filling in splits, removed knots, and removed pitch pockets. After the repair efforts, the outermost veneer is then sanded to smooth the surface. The repaired plywood panel must then be placed between two sets of overlay component sheets, or between one such set and a backer if a one-sided overlay is desired. This composite is then placed between a pair of treated cauls and reinserted into the hot press to allow the formation of the overlay through the curing process.

While this two-step manufacturing process does result in an overlay with surface characteristics superior to those obtained with the one-step process, there are many disadvantages. The veneer repair necessary with the two-step process is extremely labor intensive. Further, the two-step process requires two trips through the hot press machinery. Because the plywood alone requires roughly 6 minutes of hot press residence time, and the overlay requires roughly 9 minutes to cure during the second trip through the hot press, a total hot press residence time of about 15 minutes is required. This incremental 6 minutes of hot press residence time over that required in the one-step manufacturing process leads to extreme production bottlenecks and/or increased manpower requirements at the hot press machinery. In short, the production costs for the two-step process are significantly greater than that for its one-step counterpart.

Another important application for cellulose sheets impregnated with resin material is as an overlay for superstructure surfaces in marine environments (boats, etc.). This application requires both aesthetics and functionality from the overlay, whereas functionality alone was the chief requirement in concrete form applications. With the higher grade veneers of the past, a single uncured cellulose sheet impregnated with polyester resin (hereinafter poly sheet) was used as the overlay. As veneer quality dropped, an overlay consisting of a single poly sheet over one MDO sheet was fairly recently developed. Cellulose sheets impregnated with polyester resin are much more expensive than sheets impregnated with phenolic resin. However, in this environment where aesthetics and structural permanence are important, the higher cost is warranted by the superior surface characteristics achievable with the polyester resin. Given the cost justifications, a single sheet of MDO is used to help further isolate the polyester resin layer from the surface of the underlying plywood substrate.

The one uncured poly sheet over one cured MDO sheet overlay is readily produced by the one-step process described above. However, the curing time for the poly sheet is significantly less (4 to 6 minutes). Shrinkage is also a concern with poly sheet overlays, but to a lesser degree. Just as with concrete form overlays, a two-step process for producing this overlay also exists, but at significantly increased costs. This overlay aimed at marine superstructure surfaces must also compete with Formica overlays, which possess excellent surfaces qualities, but are much more expensive. If the surface qualities of poly sheet overlays continue to decline as veneer quality decreases, a good portion of their market will be lost to Formica overlays, even though Formica is significantly more expensive.

As a result of the reasons detailed above, there has been a long-felt need for an overlay applicable to plywood and the like that effectively bridges underlying irregularities, exhibits superior surface characteristics, minimizes shrinkage concerns, and is relatively cost effective. This invention is directed to satisfying this need.

SUMMARY OF THE INVENTION

In accordance with this invention, an improved method for providing a smooth, abrasion resistant surface substantially free of surface irregularities on a solid substrate possessing surface irregularities is disclosed. The method comprises the following steps: (a) forming a laminate overlay having at least two sheets of cellulose impregnated with a thermosettable resin; (b) substantially curing the thermosettable resin to form a laminate overlay that is both precured and bonded; and (c) adhering the precured bonded laminate overlay to a solid substrate possessing surface irregularities so as to substantially bridge the irregularities. The thermosettable resin is cured by application of heat and pressure in a hot press. Preferably, a temperature ranging from about 270° F. to about 315° F., and a pressure of about 200 psi gauge, are administered. Most preferably, the temperature ranges from about 285° F. to about 300° F. In further accordance with this invention, a composite comprising the solid substrate having the precured bonded laminate overlay adhered to it is disclosed. The precured bonded laminate overlay alone also is disclosed.

In accordance with a further aspect of the present invention, the precured bonded laminate overlay may be adhered to a solid substrate of plywood or the like to produce a composite, or panel, that is ideally suited for use as a concrete form. In this embodiment, the laminate overlay comprises two uncured cellulose sheets impregnated with high density phenolic resin (HDO) over a single cured cellulose sheet impregnated with medium density phenolic resin (MDO), the combination being substantially cured to form a precured bonded laminate overlay before being adhered to the solid substrate. Preferably, the two HDO sheets range from about 45% to about 70% phenolic resin, and the MDO sheet ranges from about 22% to about 45% phenolic resin, both by weight based on the total weight of cellulose and resin present within each sheet. Most preferably, the phenolic resin contents are from 50% to 67% for the HDO sheets, and from 28% to 37% for the MDO sheet.

In accordance with another aspect of the present invention, the precured bonded laminate overlay may be adhered to a solid substrate of plywood or the like to produce a composite, or panel, ideally suited for use in superstructure surfaces in marine environments. In this embodiment, the laminate overlay comprises a single uncured cellulose sheet impregnated with polyester resin (poly sheet) over two cured cellulose sheets impregnated with medium density phenolic resin (MDO), the combination being substantially cured to form a precured bonded laminate overlay before being adhered to the solid substrate. Preferably, the poly sheet ranges from about 45% to about 70% polyester resin, and the two MDO sheets range from about 22% to about 45% phenolic resin, both by weight based on the total weight of cellulose and resin present within each sheet. Most preferably, the polyester resin content is from about 58% to 62% for the poly sheet, and the phenolic resin content is from about 28% to 37% for the two MDO sheets.

As will be readily appreciated, a precured bonded laminate overlay formed and adhered to an underlying solid substrate in accordance with the present invention provides an overlay exhibiting surface characteristics drastically improved over overlays obtained by conventional methods. This improvement is the direct result of substantially curing the thermosettable resin prior to contact with the underlying substrate. In this way, the overlay may be formed between two nearly perfectly smooth surfaces. In contrast, conventional overlays are formed between one smooth surface and the surface of the underlying solid substrate containing significant surface irregularities. Because curing causes the resin material to become thermoset, thereby establishing a fixed final structure, the precured bonded laminate overlay of the present invention is rigid enough to help bridge the surface irregularities of the solid substrate. In contrast, the final fixed structure of conventional overlays is principally dictated by the surface irregularities of the underlying solid substrate, thereby leading to irregularities in the outer surface of the overlay.

BRIEF DESCRIPTION OF THE DRAWINGS

The foregoing and other features and advantages of the present invention will become more readily appreciated as the same becomes better understood by reference to the following detailed description of the invention and the accompanying drawings wherein:

FIG. 1A is a cross-sectional view of a laminate overlay, in a precured and prebonded state, formed in accordance with the invention particularly applicable as an overlay for concrete forms;

FIG. 1B is the laminate overlay of FIG. 1A that, after being substantially cured and thereby bonded, is in a form that may be readily adhered to an underlying solid substrate;

FIG. 2A is a cross-sectional view of an alternative embodiment of a laminate overlay, in a precured and prebonded state, formed in accordance with the invention also particularly applicable as an overlay for concrete forms;

FIG. 2B is the laminate overlay of FIG. 2A that, after being substantially cured and thereby bonded, is in a form that may be readily adhered to an underlying solid substrate;

FIG. 3A is a cross-sectional view of a laminate overlay, in a precured and prebonded state, formed in accordance with the invention particularly applicable as an overlay for marine superstructure surfaces; and, FIG. 3B is the laminate overlay of FIG. 3A that, after being substantially cured and thereby bonded, is in a form that may be readily adhered to an underlying solid substrate.

DETAILED DESCRIPTION OF THE INVENTION

In accordance with the present invention, an improved method for providing a smooth, abrasion resistant surface substantially free of surface irregularities on an underlying solid substrate possessing surface irregularities is disclosed. The method comprises the steps of: (a) forming a laminate overlay having at least two cellulose sheets impregnated with a thermosettable resin; (b) substantially curing the thermosettable resin with the sheets to form a rigid laminate overlay that is both precured and bonded; and (c) adhering the precured bonded laminate overlay to a solid substrate possessing surface irregularities so as to substantially bridge the irregularities. The precured bonded laminate overlay itself, and a composite of the overlay and the solid substrate, are also disclosed.

Thermosettable resins particularly suited for use in the present invention include phenolic, polyester, and melamine resins. However, this list is not be construed as exhaustive, for it is anticipated that other thermosettable resin materials may be employed.

The laminate overlay of the present invention may be applied to the following solid substrates: plywood, particle board, medium density fiberboard, waferboard, oriented strand board, and metal. Preferably, the solid substrate is plywood. Again, this list of potential solid substrates is not meant to be exhaustive.

The forming and curing steps of the method of the present invention are performed in a hot press to produce a precured bonded laminate overlay. While it is possible for the precured bonded laminate overlay of the present invention to be produced in a small, manually operated hot press, it is anticipated that it will have a greater impact and frequency of application in large-scale, commercial overlay hot presses. In the overlay hot press setting, the cellulose sheets impregnated with resin material are stacked to form a laminate overlay, and then covered on both sides by cauls. To keep the overlay from sticking to the surface of the caul, the caul is treated with a conventional release agent. An example of a suitable release agent is a solution of approximately 10% stearic acid in isopropyl alcohol. This combination of overlay components covered on both sides by cauls may then be inserted into the openings between adjacent platens in the commercial overlay hot press. Where a higher level of laminate overlay production is desired, perhaps as many as 10 combinations may be successively stacked and the entire group inserted into the openings between adjacent platens. The hot press is then engaged until the uncured thermosettable resin contained within the cellulose sheets is substantially cured. When curing is complete, the result is the precured bonded laminate overlay of the present invention. No special cooling provisions need be taken.

The amount of hot press time required to form the precured bonded laminate overlay varies principally as a function of type of resin employed. Preferably, the hot press is operated at pressures of approximately 200 psi gauge and temperatures ranging from about 270° to 315° F. Most preferably, a temperature ranging from about 285° to about 300° F. is used.

The step of adhering the precured bonded laminated overlay to the solid substrate may be accomplished through the use of pressure and adhesive alone. However, it is preferable that both pressure and heat be employed to ensure a more secure adhesion. Given this, it is preferred that the adhering step be performed at the same time that the solid substrate, preferably plywood, is being fabricated. Commercially, this is done almost exactly as in the Hi-Med overlay process for concrete forms described in the Background of the Invention section above. One deviation is that the substantially precured bonded laminate overlay of the present invention is substituted for the individual cellulose sheets that make up the Hi-Med overlay, two of which are impregnated with uncured resin. Additionally, because the laminate overlay of the present invention has been substantially precured, the hot press residence time is reduced to the amount of time required to produce the plywood substrate. Another deviation is that no special cooling provisions need be taken.

In order to obtain proper adhesion in the hot press between the precured bonded laminate overlay and the solid substrate, a low water content adhesive must be applied between them. While many commercially available adhesives may be employed, a paper glue line sold under the trade name Plyocite PGL (Product No. 42-206) by Reichhold Chemicals, Inc. of Tacoma, Wash. has proven quite satisfactory for such use. Paper glue line consists of an extremely thin sheet of cellulose impregnated with a high amount of resin. Consequently, the paper glue line possesses the adhesion properties of production grade glue, but with a much lower water content. This lower water content is required or blisters will be formed beneath the surface of the overlay, thereby causing improper bonding and potential surface irregularities on the outside surface of the overlay.

It is important that the laminate overlay of the present invention is substantially cured separately, away from the underlying substrate. In this way, the shrinkage which is a natural phenomenon of thermosettable resins that are cured also occurs away from the underlying substrate. The precured bonded laminate overlay will then experience only minimal shrinkage when later adhered to the solid substrate in a hot press. As a result, there is a drastic reduction in the amount of face checks and warping of the underlying solid substrate.

The outer surface of the precured bonded laminate overlay is extremely smooth because it was formed between the pristine surfaces of the cauls, not between a caul and an underlying solid substrate having surface irregularities. Additional insurance against surface irregularities being manifested in the overlay comes from the rigid nature of the precured bonded laminate overlay, which tends to bridge rather than mirror the surface irregularities of the underlying substrate. Rigidity is the result of curing, which causes the molecular structure of the thermosettable resin in the overlay to become cross-linked, or thermoset, and therefore rigidly fixed. Once thermoset, the overlay does not remelt during its return to the hot press. Accordingly, its extremely smooth surface is retained.

While not meant to be limiting, two particular applications of the laminate overlay of the present invention will be discussed. The first application is as an overlay for concrete forms (or highway signs), where the overlay surface must be significantly smooth, water resistant, and abrasion resistant. The second application is as an overlay for superstructure surfaces in marine environments (e.g., boats), where the overlay surface must exhibit extremely high smoothness, water resistance, and abrasion resistance. Further, this overlay surface must be resistant to ultraviolet light degradation.

In the concrete forms application, the laminate overlay 10, prior to curing, comprises two uncured cellulose sheets impregnated with high density phenolic resin (HDO) 12 over a single cured cellulose sheet impregnated with medium density phenolic resin (MDO) 14, as shown in FIG. 1A. The HDO sheets 12 and MDO sheet 14 are simply stacked to form laminate overlay 10. While the surfaces of the uncured HDO sheets 12 are somewhat tacky, no actual bonding between the sheets occurs. It is preferred that the two HDO sheets 12 contain from about 45% to about 70% phenolic resin by weight, based on the total weight of the cellulose and resin contained within each sheet. In the most preferred form of the laminate overlay, the two HDO sheets 12 contain from about 50% to about 67% phenolic resin by weight. It is preferred that the single MDO sheet 14 contain from about 22% to about 45% phenolic resin by weight, based on the total weight of cellulose and resin contained within each sheet. It is most preferred that the single MDO 14 sheet contain from about 28% to about 37% phenolic resin by weight. In both the preferred and most preferred forms of the laminate overlay 10, the two HDO sheets 12 need not have substantially identical resin content, but they must fall within the above-prescribed ranges.

After being substantially cured, the laminate overlay 10 has been transformed into precured bonded laminate overlay 16 (see FIG. 1B). The two uncured HDO sheets 12 have melted, freely flowed over the surface of cured MDO sheet 14, and combined to form a thicker cured HDO layer 18. The high resin content of cured HDO layer 18 has allowed cured HDO layer 18 to self-bind to underlying cured MDO sheet 14.

HDO and MDO sheets matching the above specifications are commercially available. A HDO sheet containing approximately 50% phenolic resin by weight, sold under the trade name Plyocite (Product No. 42-252) by Reichhold Chemicals, Inc. of Tacoma, Wash., has been found quite satisfactory for such use. Another potential supplier of HDO sheets containing approximately 50% phenolic resin is Simpson Timber Company of Portland, Oreg. These sheets are offered under the product name Simpson 142 High Density Overlay. A MDO sheet containing approximately 35% phenolic resin by weight, sold under the trade name Metron (Product No. 42-586) by Reichhold Chemicals, Inc. of Tacoma, Wash., has been found quite satisfactory for such use. Another potential supplier of MDO sheets containing approximately 35% phenolic resin is Simpson Timber Company of Portland, Oreg. These sheets are offered under the trade name Meden (Product No. 35-321). While the above have been cited as potential sources of HDO and MDO sheets, it should be understood that other products possessing similar properties may be employed.

In an alternative embodiment of the concrete forms application, the laminate overlay 20, prior to curing, comprises a single uncured HDO sheet 22 over a single cured MDO sheet 14, as shown in FIG. 2A. Because only a single HDO sheet is used, its phenolic resin content is higher than that found in the two HDO sheet embodiment described above. It is preferred that the higher resin content HDO sheet 22 contain from about 60% to about 85% phenolic resin by weight, based on the total weight of the cellulose and resin in the sheet. It is most preferred that the higher resin content HDO sheet 22 contain from about 65% to about 70% phenolic resin by weight.

After being substantially cured, the laminate overlay 20 has been transformed into precured bonded laminate overlay 24 (see FIG. 2B). The uncured, higher resin content HDO sheet 22 has melted, freely flowed over the surface of cured MDO sheet 14, and set to form cured HDO layer 26. The high resin content of cured HDO layer 26 has enabled cured HDO layer 26 to self-bind to underlying cured MDO sheet 14.

Uncured, higher resin content HDO sheets, having a phenolic resin content of 66%, are commercially available from Catalin, Ltd. of Essex, England under the product name Phenolic Surface Film. Essentially equivalent products could, of course, be substituted. Suppliers of commercially available MDO sheets matching the specifications are detailed above.

This single HDO sheet embodiment was briefly tried using conventional overlay methods, but was rejected because the tremendous shrink factor of a single high resin content HDO sheet could not be overcome. Given the reduced concerns regarding shrinkage possible with the overlay produced by the method of the present invention, this single HDO sheet approach should now be technically feasible.

Either of the two above-described embodiments applicable to concrete forms would have similar applicability to overlays for highway signs. This is because the desired surface characteristics and nature of the underlying substrate are virtually identical in each environment.

In the marine superstructure surfaces application, the laminate overlay 28, prior to curing, comprises a single uncured cellulose sheet impregnated with polyester resin (poly sheet) 30 over two MDO sheets 14, as shown in FIG. 3A. Alternatively, the laminate overlay could comprise a single poly sheet over a single MDO sheet, as is done in conventional overlays. However, superior overlay characteristics occur with two MDO sheets at only moderate increases in overlay cost. It is preferred that poly sheet 30 contain from about 45% to about 70% polyester resin by weight, based on the total weight of the cellulose and resin contained within the sheet. It is most preferred that poly sheet 30 contain from about 58% to about 62% polyester resin. Poly sheet 30 is usually pigmented or of wood grain pattern. It is preferred that the two MDO sheets 14 contain from about 22% to about 45% phenolic resin, based on the total weight of the cellulose and resin contained within each sheet. It is most preferred that the two MDO sheets 14 contain from about 28% to about 37% phenolic resin. In both the preferred and most preferred forms of laminate overlay 28, the two MDO sheets 14 need not have substantially identical resin content, but must fall within the above-prescribed ranges.

Because the adjacent MDO sheets 14 are not self-binding due to their low resin content and cured nature, a low water content adhesive 32 must be applied to at least one opposing surface of MDO sheets 14 to ensure proper adhesion. Preferably, one of the MDO sheets is prefabricated with a layer of low water content adhesive 32 on one surface that becomes active upon the application of heat.

After being substantially cured, the laminate overlay 28 has been transformed into precured bonded laminate overlay 34 (see FIG. 3B). The uncured polyester resin sheet 30 has melted, freely flowed over the surface of upper cured MDO sheet 14, and set to become cured polyester resin layer 36. The high resin content of cured polyester resin layer 36 has enabled cured polyester resin layer 36 to self-bond to upper cured MDO sheet 14. Additionally, adhesive 32 has sufficiently cured to securely bond the two adjacent MDO sheets 14. Textured release paper may be applied to the surface of each caul prior to curing to impart a textured finish to the overlay.

Uncured polyester resin sheets and cured MDO sheets matching the above specifications are commercially available. Uncured polyester resin sheets containing 58% and 62% polyester resin by weight, sold under the trade name Decorative Plyocite by Reichhold Chemicals, Inc. of Tacoma, Wash., have been found quite satisfactory for such use. A MDO sheet containing approximately 35% phenolic resin by weight and having a low water content adhesive prefabricated on one surface sold under the trade name Metron (Product No. 42-585) by Reichhold Chemicals, Inc. of Tacoma, Wash., has been found quite satisfactory for such use. Another potential supplier of MDO sheets containing approximately 35% phenolic resin and possessing such an adhesive is Simpson Timber Company. These sheets are offered under the trade name Meden (Product No. 35-321, with glue option). The composition of the low water content adhesive is proprietary in both products. Suppliers of commercially available MDO sheets without a prefabricated layer of low water content adhesive and matching the specifications are detailed above. Essentially equivalent products could, of course, be substituted.

EXAMPLES

The following Examples are included to assist one of ordinary skill in making and using the invention. They are intended as representative examples of the present invention and are not intended in any way to limit the scope of this disclosure or the scope of protection granted by Letters Patent hereon. The following Examples also are included to provide a comparison between concrete forms overlaid with the precured bonded laminate overlay of the present invention and with a representative overlay produced by conventional methods. This comparison was performed in laboratory-scale tests in Example 1 and in commercial-scale tests in Example 2.

EXAMPLE 1

Seven precured bonded laminate overlays formed in accordance with the present invention, and having application as an overlay for concrete forms, were first produced. Production took place in a small laboratory test press, capable of accommodating samples whose dimensions did not exceed 10 inches square and specifically designed to simulate conditions found in commercial overlay presses and plywood presses. The components of the overlay consists of two HDO sheets containing 50% phenolic resin, sold under the product name Simpson 142 High Density Overlay by Simpson Timber Company of Portland, Oreg., over a single MDO sheet containing 35% phenolic resin, sold under the trade name Metron (Product No. 42-586) by Reichhold Chemicals, Inc. The three sheets were placed between treated cauls. The entire combination was then inserted into the test press, which was operated at 305° F. and 200 psi gauge for a period of 7 minutes. The resultant precured bonded laminate overlay was then allowed to slowly cool at room temperature. The process was repeated until all 7 overlays were formed.

Seven concrete form samples, bearing the above-described precured bonded laminate overlay on one surface of a plywood substrate and a conventional overlay on the other surface, were then produced for comparison purposes.

The 7 plywood substrates each measured 10 inches by 10 inches and consisted of 7 plies of fir having a cumulative thickness of 11/16 inch. A thin layer of production grade glue was placed between adjacent fir plies. As near as possible, duplicate defects were selected or created on the outermost plies (face ply) of each concrete form sample. The defects of greatest concern for outer plys are splits, rough grain, and pitch pockets. Because it is these defects that most commonly lead to rejection as an outer ply or to failure of the form during use, they were tested. Severe outer ply defects, such as open knots, cause automatic rejection of the ply. Consequently, such outer ply defects were not tested. However, when these severe defects exist on the next ply inward, the core ply, the ply may still be utilized. Therefore, common core ply defects were tested. The defects chosen for testing are shown in Table I, below.

TABLE I

| Defect | Conventional Overlay | Invention Overlay |
| --- | --- | --- |
| 3/32" to 5/32" tapered face split | quite visible | Nearly invisible |
| rough grain | visible low pressure streaks | invisible |
| pitch pockets | extremely visible low pressure area | invisible |
| ⅜" knot debris under overlay | extremely visible with surrounding low pressure area | visible |
| ¼" to ⅜" core gaps | visible | invisible |
| 1" open core knots | invisible | invisible |
| 1¼" open core knots | somewhat visible | invisible |

On one defect-ridden outer surface of each plywood substrate was placed the precured bonded laminate overlay of the present invention, formed as described above. Between the precured bonded laminate overlay and the outer surface was placed a thin sheet of paper glue line. The paper glue line used is sold under the trade name Plyocite PGL (Product No. 42-206) by Reichhold Chemicals, Inc. of Tacoma, Wash. Though not required with the precured bonded laminate overlay of the present invention, a treated caul was employed on the outside surface of the overlay for consistency of testing.

On the other defect-ridden outer surface of each plywood substrate was placed a conventional overlay. For testing consistency, two uncured HDO sheets identical to those employed in the formation of the precured bonded laminate overlay of present invention were used. However, a cured MDO sheet containing 35% phenolic resin sold under the trade name Meden (Product No. 35-321) by Simpson Timber Company, prefabricated with low water content adhesive on one side, was substituted for the MDO sheet used in the precured bonded laminate overlay. A treated caul was placed over the outside HDO sheet.

All 7 concrete form samples (invention overlay/plywood substrate/conventional overlay), surrounded by cauls, were then placed in the test press for a period of 9 minutes under conditions of 305° F. and 200 psi gauge. Nine minutes was the time required to cure the uncured resin material present in the conventional overlay. After the completion of the 9 minutes residence time within the test press, the overlaid concrete form samples were then immediately cooled by exposure to open air. After cooling, visual comparisons between the two overlays were then made.

The results of visual comparisons between the conventional overlay side and the invention overlay side of the 7 concrete form samples are shown in Table I. In each instance where an underlying defect was apparent on or through the surface of the conventional overlay, the same defect was more effectively covered by the precured and bonded invention overlay. Such visual analysis of overlays has historically proven to be a reliable indicator of how a concrete form will perform. In essence, visual flaws in an overlaid concrete form directly translate to functional failure in the field.

The invention overlay side of one of the 7 concrete form samples was also tested for abrasion resistance. The test was conducted with a Taber Abraser, Model No. 503, supplied by Testing Machine International of Montreal, Canada, to yield a Taber Abrasion number. In short, this number measures the thickness loss of the overlay per 10,000 revolutions of the machine. American Plywood Association specifications dictate a maximum thickness loss of 0.0100 inches for concrete form overlays of the type here manufactured. Historical numbers for conventional overlays have been well under this maximum, ranging from 0.0020 to 0.0030 inches. The precured bonded laminate overlay of the present invention yielded equivalent abrasion resistance results, measuring a consistent thickness loss of 0.0021 inches at various tested positions over the surface of the overlay.

EXAMPLE 2

Fifteen precured bonded laminate overlays formed in accordance with the present invention, and having application as an overlay for concrete forms, were first produced. Production took place in a standard-sized commercial overlay press so as to produce overlays of 4'×8' dimensions. The components of the overlay consisted of two HDO sheets containing 50% phenolic resin, sold under the trade name Plyocite (Product No. 42-252) by Reichhold Chemicals, Inc. of Tacoma, Wash., over a single MDO sheet containing 35% phenolic resin, sold under the trade name Metron (Product No. 42-586) by Reichhold Chemicals, Inc. The three sheets were placed between treated cauls. The entire combination was then inserted into the overlay press, which was operated at a temperature of 285° F. and a pressure of 200 psi gauge, or lower, for a period of 7 minutes. The resultant precured bonded laminate overlay was then allowed to slowly cool at room temperature.

Thirteen concrete form samples bearing the above-described precured bonded laminate overlay on one surface of a plywood substrate, and 13 concrete form samples bearing a conventional overlay on one surface of a plywood substrate, were then produced for comparison purposes. Additionally, 1 concrete form sample bearing the above-described precured bonded laminate overlay on both surfaces of a plywood substrate, and 1 concrete form sample bearing a conventional overlay on both surfaces of a plywood substrate, were also produced.

The 28 plywood substrates each measured approximately 4'×8' and consisted of 7 plies of fir having a cumulative thickness of 11/16 inch. A thin layer of production grade glue was placed between adjacent fir plies. As near as possible, duplicate naturally occurring defects were selected on the outermost plies (face ply) of each concrete form sample. Because core ply defects were so effectively covered by the invention overlay during the tests described in Example 1, core ply defects were not tested here. However, defects of greatest concern for outer plies (splits, rough grain, and pitch pockets) were tested. Because severe face ply defects, such as open or tight knots, usually mean automatic rejection as a face ply, they were not tested in Example 1. However, given the general success of the precured bonded laminate overlay of the present invention in the Example 1 tests, these defects were tested here. The defects chosen for testing are shown in Table II, below.

TABLE II

| Defect | Conventional Overlay | Invention Overlay |
| --- | --- | --- |
| 1/16" to ⅜" wide face splits | visible | invisible |
| rough grain | extremely visible substantial low pressure areas on surface | nearly invisible; no low pressure areas |
| pitch pockets | extremely visible substantial low pressure areas on surface | invisible; no low pressure areas |
| ¼" to ½" open face knots | extremely visible | nearly invisible |
| ½" to ¾" open face knots | extremely visible | nearly invisible |
| 2" tight face knots | knots invisible; surrounding rough grain areas caused extremely visible low pressure areas | knots invisible; surrounding rough grain areas could be felt but not seen |

The 13 plywood substrates bearing the precured bonded laminate overlay of the present invention on one outer surface had no backer sheet applied to the opposite surface. Between the precured bonded laminate overlay and the outer surface was placed a thin sheet of paper glue line. On the 1 plywood substrate bearing the precured bonded laminate overlay on both sides, two sheets of paper glue line were used (one under each overlay). The paper glue line is sold under the trade name Plycite PGL (Product No. 42-206) by Reichhold Chemicals, Inc. of Tacoma, Wash. In contrast to the tests in Example 1, no treated caul was employed on the outside surface of the overlay.

Thirteen plywood substrates were overlaid on one outer surface with a conventional overlay and on the opposite surface with a backer sheet. One plywood substrate was overlaid on both sides with the conventional overlay. For testing consistency, two uncured HDO sheets identical to those employed in the formation of the precured bonded laminate overlay of the present invention were used. However, a cured MDO sheet containing 35% phenolic resin and prefabricated with low water content adhesive on one side, sold under the trade name Metron (Product No. 42-585) by Reichhold Chemicals, Inc., was substituted for the MDO sheet used in the precured bonded laminate overlay. The backer sheet employed was a single uncured HDO sheet identical to the 2 uncured HDO sheets used as a component in the overlay. A treated caul was placed over the outside HDO sheet.

All 14 concrete form samples bearing one or more precured and bonded invention overlays, were then placed without cauls in the overlay press for a period of 6 minutes under conditions of 285° F. and 200 psi gauge. All 14 concrete form samples bearing one or more conventional overlays, surrounded by treated cauls, were placed in the overlay press for a period of 8½ minutes under conditions of 285° F. and 200 psi gauge. After cooling, visual comparisons between concrete forms bearing the two overlays were then made.

The results of visual comparisons between the 15 concrete form surfaces overlaid with the conventional overlay, and the 15 concrete form surfaces bearing the invention overlay, are shown in Table II. Given the large number of overlay surfaces involved, the data in Table II represent averages. Just as in the laboratory-scale tests of Example 1, these commercial-scale tests clearly show improved surface characteristics on those concrete form samples overlaid with the precured bonded laminate overlay of the present invention.

While the commercial-scale production tests above were performed on an overlay press, it will be appreciated by persons skilled in the art that the method of the present invention, and the improved overlay characteristics resulting therefrom, are equally applicable to commercial plywood presses.

CONCLUSION

In summary, a precured bonded laminate overlay formed and applied in accordance with the present invention provides a smoother and more abrasion-resistant surface, substantially free of surface irregularities, to a solid substrate possessing surface irregularites than is attainable by conventional overlay methods. Precuring the laminate overlay between two extremely smooth surfaces (cauls), rather than between one smooth surface and a solid substrate of irregular surface as done in conventional methods, produces an overlay surface of drastically improved smoothness and integrity. Additionally, the precured aspect of the overlay of the present invention also provides a fixed final structure and rigidity to the overlay, which allows surface irregularities on the underlying solid substrate to be bridged and thereby not reflected on the outer surface of the overlay. In addition, the overlay of the present invention essentially eliminates the critical concern of shrinkage incident to curing the thermosettable resin contained in the overlay. This is because the curing, and therefore the shrinkage, occurs in a more controlled environment removed from the underlying solid substrate. In the concrete forms arena, an application area where the overlay of the present invention was both produced and tested, the following advantages were observed or are anticipated: improved surface quality, utilization of lower grade veneer, lower production costs, and lower overlay costs.

The best evidence of the higher surface quality obtained with the overlay of the present invention is contained in Tables I and II above. As clearly shown in the tables, defects that typically cause rejection of concrete forms, whether before sale or after failure in the field, were better overcome by the overlay of the present invention. The visibility of underlying defects, clearly evident in the samples produced with the conventional overlay, were drastically reduced or eliminated in similar samples possessing the overlay of the present invention. The same improvement was observed with low pressure spots, which manifest as areas of roughness and lower abrasion resistance on the surface of the overlay. Improvements were observed in both the laboratory-scale and commercial-scale test outlined in the Example section above. These superior surface characteristics directly translate to improved performance in the field for concrete forms so overlaid. Superior overlay smoothness results in a smoother finish being imparted to the concrete that is poured. Improved surface smoothness also results in less concrete sticking to the form. Improved abrasion-resistance and the ability to more adequately cover underlying defects means that the concrete forms will simply last longer because the surface of the overlay will not be degraded or penetrated as quickly. As a result, it is anticipated that a concrete form made with typically available lower grade veneer and bearing the overlay of the present invention may see over 100 reuses in the field, whereas conventional overlays on similar veneer typically see 20-50 reuses. When penetration or degradation of the overlay surface occurs, soluble wood extracts escape from the underlying solid substrate and inhibit concrete curing. This phenomenon, known as sugaring, is manifested as soft spots that do not properly set up on the surface of the formed concrete. It is anticipated that the improved surface integrity of the overlay of the present invention will help reduce this concern, as well.

Another advantage of the overlay of the present invention is that it allows the utilization of lower grade veneer than is possible with conventional overlay methods. The two most common defects responsible for the rejection of veneer as the outer ply in a concrete from substrate, splits and rough grain, can now be adequately covered. This is critical given that the availability of higher quality veneer has drastically dropped in recent years, and will continue to do so in the future, as the source and availability of old growth timber diminishes. Because the precured nature of the overlay of the present invention allows veneer defects to be more effectively covered, a manufacturer not only should expect to be able to cover veneers previously thought incapable of being overlaid, but should also see an improved overlay surface and a lower rate of rejection on veneers having a quality currently deemed worthy of overlay.

Lower production costs are also possible with the overlay of the present invention. Because the overlay is precured before adherence to the underlying substrate (plywood), a shorter residence time within the plywood hot press, or the overlay hot press, is possible. This is due to the fact that the residence time must only be sufficient to adequately cure the glue between adjacent plys of wood, and not sufficient to adequately cure the uncured resin present in conventional methods of overlay. Using ¾ inch plywood as an example, the plywood hot press, or overlay hot press, residence time may be cut from about 9 minutes to about 6 minutes. In the past, concerns of overcuring the overlay, which causes shrinkage that can lead to face checks or warping of the underlying substrate, have led to concrete forms being produced where the resin material has not been completely cured. The result of undercuring an overlay is the formation of a fugitive phenolic dye that causes a discoloration (pinking) at the surface of the concrete. The discoloration will persist until sufficient exposure to ultraviolet light or the administration of a strong oxidizing agent occurs. Because the overlay of the present invention can be completely cured, and thereby shrunk, in an isolated environment, this shrinkage concern is eliminated. Consequently, undercuring should not pose a problem in the future. Elimination of the shrinkage concern also eliminates the need for costly cooling processes which, in an effort to control shrinkage, are utilized in conventional overlay methods immediately after the overlaid substrate leaves the hot press. Since the overlay of the present invention may be formed without cauls, a significant reduction in caul replacement purchases and maintenance is possible. Manpower reductions also are possible due to the elimination of caul handling. An additional advantage of eliminating the use of cauls is that the overlay process may now be applicable to large automated plywood presses. In the past, large automated plywood presses could not accommodate the cauls and would malfunction. Another potential production cost reduction occurs because the precured nature of the overlay of the present invention requires no backer sheet to control warp on one-sided overlaid concrete forms. While not having a major effect on production costs, elimination of the backer should slightly reduce manpower requirements and total process time. A significant reduction in production costs occurs because the number of overlaid concrete forms rejected is drastically reduced when the method of the present invention is employed. The reject rate is reduced because the overlay of the present invention is formed in the absence of contaminating debris and defects supplied by the veneer. While the debris may still be present when the overlay is later adhered to the solid substrate, the effect of such debris on the ultimate surface quality of the overlay is diminished, given that the overlay has become rigid through the curing process before adherence.

Lower overlay costs to the consumer are possible because the savings in production costs detailed immediately above will be passed on to the consumer. Additionally, because a concrete form of typically available lower grade veneer bearing the overlay of the present invention is capable of many more reuses than overlaid concrete forms of similar quality veneer produced by conventional methods, the consumer should be able to make fewer purchases. Significantly lower overlay costs also occur because the overlay of the present invention requires no backer sheet. Backer sheets are usually a single HDO sheet, which means they have a cost that is significant in relation to the total cost of the component sheets used to form the overlay. Yet another potential overlay cost reduction could occur if it becomes technically feasible to substitute a single high resin content HDO sheet for the two HDO sheets that were used in the overlay produced and tested (fully described in the Example section above).

Similar surface quality gains would be possible with the above-disclosed, polyester-based overlay of the present invention having application to marine superstructures. It is also anticipated that the overlaid superstructure produced by the disclosed method could be manufactured at much lower production and overlay costs than that found with conventional methods of production.

The present invention has been described in relation to several preferred embodiments thereof. One of ordinary skill, after reading the foregoing specification, will be able to effect various changes, substitutions of equivalence, and other alterations without departing from the broad concepts disclosed herein. It should be understood that a cellulose sheet containing thermosettable resin in a partially cured state may be deemed as uncured for purposes of the invention. In addition, it should be appreciated that the invention reaches beyond the three particular embodiments fully disclosed above. For example, a single thicker MDO sheet could be substituted whenever a particular embodiment required two MDO sheets. Similarly, a like substitution could be made with HDO sheets. It is therefore intended that the scope of Letters Patent granted hereon be limited only by the definition contained in the appended claims and equivalents thereof.

The embodiments of the invention in which an exclusive property or privilege is claimed are defined as follows:

1. A composite having a smooth, abrasion resistant surface substantially free of surface irregularities, said composite comprising:
   (a) a solid substrate having surface irregularities; and,
   (b) a precured bonded laminate overlay adhered to said solid substrate so as to substantially bridge the irregularities, said precured bonded laminate overlay being separately formed by contacting, substantially curing, and thereby bonding at least two sheets each comprising cellulose impregnated with a thermoset resin, wherein at least one of said sheets initially comprises substantially cured thermoset resin and at least one of said sheets initially comprises uncured thermoset resin at the time of formation of said precured bonded laminate overlay.

2. The composite of claim 1, wherein said thermoset resin is selected from the group consisting of phenolic, polyester, and melamine resins.

3. The composite of claim 1, wherein said precured bonded laminate overlay is formed of two uncured sheets impregnated with high density phenolic resin over a single cured sheet impregnated with medium density phenolic resin.

4. The composite of claim 3, wherein said uncured sheets impregnated with high density phenolic resin comprise from about 45% to about 70% phenolic resin by weight and said cured sheet impregnated with medium density phenolic resin comprises from about 22% to about 45% phenolic resin by weight.

5. The composite of claim 4, wherein said uncured sheets impregnated with high density phenolic resin comprise from about 50% to about 67% phenolic resin by weight and said cured sheet impregnated with medium density phenolic resin comprises from about 28% to about 37% phenolic resin by weight.

6. The composite of claim 1, wherein said precured bonded laminate overlay is formed of a single uncured sheet impregnated with high density phenolic resin over a single cured sheet impregnated with medium density phenolic resin.

7. The composite of claim 6, wherein said uncured sheet impregnated with high density phenolic resin comprises from about 60% to about 85% phenolic resin by weight and said cured sheet impregnated with medium density phenolic resin comprises from about 22% to about 45% phenolic resin by weight.

8. The composite of claim 7, wherein said uncured sheet impregnated with high density phenolic resin comprises from about 65% to about 70% phenolic resin by weight and said cured sheet impregnated with medium density phenolic resin comprises from about 28% to about 37% phenolic resin by weight.

9. The composite of claim 1, wherein said precured bonded laminate overlay is formed of a single uncured sheet impregnated with polyester resin over two cured sheets impregnated with medium density phenolic resin.

10. The composite of claim 9, wherein said uncured sheet impregnated with polyester resin comprises from about 45% to about 70% polyester resin by weight and said cured sheets impregnated with medium density phenolic resin comprise from about 22% to about 45% phenolic resin by weight.

11. The composite of claim 10, wherein said uncured sheet impregnated with polyester resin comprises from about 58% to about 62% polyester resin by weight and said cured sheets impregnated with medium density phenolic resin comprise from about 28% to about 37% phenolic resin by weight.

12. The composite of claim 9, wherein a low water content adhesive is applied to at least one opposing surface of said cured sheets impregnated with medium density phenolic resin.

13. The composite of claim 1, wherein said thermoset resin has been cured by application of heat and pressure, thereby bonding said sheets.

14. The composite of claim 13, wherein said heat has a temperature ranging from about 270° to about 315° F. and wherein said pressure is about 200 psi gauge.

15. The composite of claim 14, wherein said temperature ranges from about 285° to about 300° F.

16. The composite of claim 1, wherein said solid substrate is selected from the group consisting of plywood, particle board, medium density fiberboard, waferboard, oriented strand board, and metal.

17. The composite of claim 16, wherein said solid substrate is plywood.

18. The composite of claim 1, wherein said precured bonded laminate overlay is adhered to said solid substrate by means of a low water content adhesive.

19. A precured bonded laminate overlay for use with a solid substrate having surface irregularities that provides a smooth, abrasion resistant surface substantially free of surface irregularities when adhered to the solid substrate, said precured bonded laminate overlay being separately formed by contacting, substantially curing, and thereby bonding at least two sheets each comprising cellulose impregnated with a thermoset resin, wherein at least one of said sheets initially comprises substantially cured thermoset resin and at least one of said sheets initially comprises uncured thermoset resin at the time of formation of said precured bonded laminate overlay.

* * * * *

UNITED STATES PATENT AND TRADEMARK OFFICE
CERTIFICATE OF CORRECTION

PATENT NO. : 5,089,348
DATED : February 18, 1992
INVENTOR(S) : Lauren G. Louderback It is certified that error appears in the above-identified patent and that said Letters Patent is hereby corrected as shown below:

| COLUMN | LINE | |
|---|---|---|
| 3 | 25 | "5-plywood" should be --5-ply plywood-- |
| 8 | 3 | after "not" insert --to-- |
| 8 | 46 | "laminated" should be --laminate-- |
| 15 | 30 | "Plycite" should be --Plyocite-- |
| 16 | 15 | "irregularites" should be --irregularities-- |
| 17 | 13 | "from" should be --form-- |

Signed and Sealed this

First Day of June, 1993

Attest:

MICHAEL K. KIRK

*Attesting Officer*     Acting Commissioner of Patents and Trademarks